(12) United States Patent
Leontaridis et al.

(10) Patent No.: US 7,740,731 B2
(45) Date of Patent: Jun. 22, 2010

(54) METHOD AND APPARATUS FOR MANUFACTURING A PIPE FROM PIPE SEGMENTS

(75) Inventors: Nikos Leontaridis, Alkmaar (NL); Vilnis Puce, Vienna (AT); Hans Edward Guitoneau, Grootebroek (NL)

(73) Assignee: Pipelife Nederland B.V., Enkhulzen (NL)

( * ) Notice: Subject to any disclaimer, the term of this patent is extended or adjusted under 35 U.S.C. 154(b) by 0 days.

(21) Appl. No.: 11/906,159

(22) Filed: Sep. 28, 2007

(65) Prior Publication Data
US 2008/0217913 A1    Sep. 11, 2008

(30) Foreign Application Priority Data
Mar. 6, 2007    (EP)    ................... 07103599

(51) Int. Cl.
*B29C 65/00* (2006.01)
*B32B 37/00* (2006.01)
*F02F 1/06* (2006.01)
*C08J 5/00* (2006.01)
*F16L 9/14* (2006.01)
*F16L 9/00* (2006.01)

(52) U.S. Cl. ................. 156/292; 156/293; 156/296; 156/303.1; 156/308.4; 138/142; 138/151; 138/158; 138/162

(58) Field of Classification Search ................. 156/242, 156/244.11, 244.22, 244.27, 245, 273.9, 156/292, 293, 303.1, 296; 138/109, 121, 138/120, 122, 141, 142, 151, 155, 157, 158, 138/159, 160, 161, 162, 163; 285/332, 332.1, 285/332.5
See application file for complete search history.

(56) References Cited

U.S. PATENT DOCUMENTS

| | | | | | |
|---|---|---|---|---|---|
| 1,730,612 | A | * | 10/1929 | Hotchkiss | .................... 285/330 |
| 4,110,145 | A | * | 8/1978 | Lombardi | .................... 156/218 |
| 4,310,372 | A | * | 1/1982 | Janssen et al. | .............. 156/245 |
| 4,495,970 | A | * | 1/1985 | Pate et al. | .................... 138/148 |
| 5,060,696 | A | | 10/1991 | Putter | |
| 5,124,109 | A | | 6/1992 | Drossbach | |
| 5,320,697 | A | * | 6/1994 | Hegler et al. | ................. 156/158 |
| 6,004,418 | A | * | 12/1999 | Ginman et al. | .............. 156/212 |
| 6,666,232 | B2 | | 12/2003 | Lepoutre | |
| 2003/0034650 | A1 | * | 2/2003 | Krauss et al. | ................ 285/206 |
| 2005/0284562 | A1 | * | 12/2005 | Frantz et al. | ................. 156/196 |
| 2006/0153640 | A1 | | 7/2006 | Hofmann | |

FOREIGN PATENT DOCUMENTS

EP    1306541 A1    5/2003

* cited by examiner

*Primary Examiner*—Richard Crispino
*Assistant Examiner*—Brian R Slawski
(74) *Attorney, Agent, or Firm*—The Webb Law Firm

(57) ABSTRACT

A method for assembling a corrugated double-walled pipe section from pipe segments, having the steps of: providing an inner wall segment which is curved in circumferential direction and straight in longitudinal direction, providing an outer wall segment which is curved in circumferential direction and corrugated in longitudinal direction, connecting the inner wall segment to the concave side of said corrugated outer wall segment, providing a longitudinal profile at the longitudinally extending edges of the wall segment so as to provide a pipe segment, and connecting the adjoining longitudinal profiles of at least two of the pipe segments to each other.

11 Claims, 5 Drawing Sheets

METHOD AND APPARATUS FOR MANUFACTURING A PIPE FROM PIPE SEGMENTS

The invention is related to a method for assembling a double walled plastic pipe from pipe segments. Such a method can in particular, but not exclusively, be used for relatively large diameter pipes. Large diameter pipes, such as for instance used in sewer systems, are usually manufactured by means of extrusion. Extrusion plants constitute relatively high investments, and are therefore located at a limited number of locations. This means that the pipes in question may have to be transported over relatively long distances, especially in case the point of application is remote from the production location.

Large diameter pipes however cannot be transported efficiently. This disadvantage becomes pregnant when transporting the pipes over long distances. Having regard to the fact that the pipes cannot be nested within each other, a fairly large amount of transportation space is needed for transporting a relatively light weight product.

Attempts have been made to alleviate these transportation inefficiencies by providing pipe shells, which can be transported in a more efficient fashion. A sewer pipe of this type is diclosed in US 2006/0153640. Such prior art pipe shells, which are of a solid type, can be nested within each other, which results in a more efficient use of the transportation space such as available in e.g. a lorry and the like. The pipe shells are connected together at the site where the pipe is laid, thus forming pipes sections which are finally interconnected to form a e.g. sewer pipe.

Although said prior art method for forming a pipe section from pipe segments provides a solution to the transportation problem, nevertheless other disadvantages are introduced. For instance, the mutual connection of two or more pipe segments for forming the pipe segment is obtained by means of pins and holes or hooks. However, it is then difficult to ensure the required water tightness of the pipe thus assembled. Moreover, the pipe segment obtained has a solid wall, which is less suitable for larger pipes having regard to the large amounts of material which are necessary and the accompanying high weight of such solid walled pipe section.

The object of the invention is therefore to provide a method of the type described before for assembling a pipe section from pipe segments, but which is also suitable for larger, water tight pipes. This object is achieved through a method for assembling a corrugated double-walled pipe section from pipe segments, comprising the steps of:
  connecting a smooth inner wall sector and a corrugated outer wall segment to each other,
  providing a longitudinal profile at the longitudinal edges of said wall segments so as to provide a pipe segment,
  connecting the adjoining longitudinal profiles of at least two of said pipe segments to each other.

The method according to the invention has the advantage that it enables the production of a double walled, corrugated pipe section from pipe segments which can efficiently be transported over relatively long distances. Such double walled pipe section has a relatively high rigidity with respect to external pressure loads such as earth pressure, which rigidity results from the relative stiff character of the double walls. As a result of the corrugations, this stiffness is further improved. The stiff character of the pipe section is accompanied by a relatively low mass due to the fact that the wall of said pipe section is not solid. Moreover, the process of assembling the segments into a pipe section is promoted by the longitudinal end profiles of the segments.

In particular, the method according to the invention may comprise the steps of:
  providing longitudinal profiles each having an outer connecting surface,
  making the outer surfaces of a pipe segment face away from said wall segments,
  welding the facing outer surfaces of two adjoining pipe segments to each other.

The outer surfaces of the longitudinal profiles offer a large area for interconnecting the pipe segments, such as by means of welding or glueing said facing outer surfaces under the influence of pressure; preferably, such weldable or glueable outer surfaces are plain.

The step of welding may be carried out in different ways, for instance by heating the longitudinal profiles at their facing surfaces, e.g. by means of burners, and subsequently pressing these surfaces together. According to a preferred way, the method according to the invention may comprise the steps of:
  providing a welding strip,
  making the welding strip contact both outer surfaces of two adjoining pipe segments,
  welding the welding strip and the outer surfaces together by heating the welding strip.

Alternatively, the method according to the invention may comprise the steps of:
  providing the adjoining longitudinal profiles with corresponding shapes,
  connecting the adjoining longitudinal profiles of the pipe segments to each other by making said corresponding shapes engage each other.

This can in particular be achieved by the steps of:
  providing one of said longitudinal profiles with a protruding ridge and the other of said longitudinal profiles with a correspondingly shaped groove,
  pressing the protruding ridge of one of said longitudinal profiles into the correspondingly shaped groove of the other longitudinal profile.

Other ways of interconnecting the pipe segments are feasible as well. For instance, the longitudinal profiles may be provided with flanges which can be interconnected by bolt connections etc.

Furthermore, the method according to the invention may comprise the steps of:
  providing each circumferential end of the corrugated wall segments with a slanting surface,
  connecting each slanting surface to a corresponding longitudinal profile.

In this embodiment, a strong and reliable interconnection is obtained between the corrugations of adjoining pipe segments, which makes that the resistance against external pressures can be of the same order as in the traditional non-segmental unitary pipe.

Preferably, the pipe segments are curved according to a part of a cylinder. In that case, the plain outer surfaces can be oriented according to radial planes.

The production speed of the pipe sections can be increased by:
  providing a jig having a number of axially extending supports equal to the number of pairs of pipe segments to be connected to each other,
  fitting each pipe segment between two neighbouring supports,
  making the supports move towards each other so as to exert pressure on the longitudinal profiles of each pair of adjoining longitudinal profiles in the direction towards each other, welding or gluing the adjoining the longitudinal profiles to each other while maintaining the pressure on the longitudinal profiles.

The invention is also related to a pipe segment for use in the method described before, said pipe segment comprising a smooth inner wall segment and a corrugated outer wall segment connected to each other, as well as a longitudinal profile at each longitudinal edge of said wall segments.

It will be clear that the pipe sections, obtained by interconnecting several pipe segments, are subsequently connected to each other end to end so as to form a complete pipe. These end to end connections can be carried out in numerous ways as well, for instance by means of providing end profiles which can be glued or welded to each other, end flanges which can be bolted to each other etc.

The invention is also related to an apparatus for carrying out the method according to the invention. Said apparatus comprises a base, at least two supports erected on the base, each support comprising a fixture for fixing a pipe segment onto said supports, and operating means for moving the supports towards and from each other.

The invention will now be described further with reference to the drawings.

Figure 6:
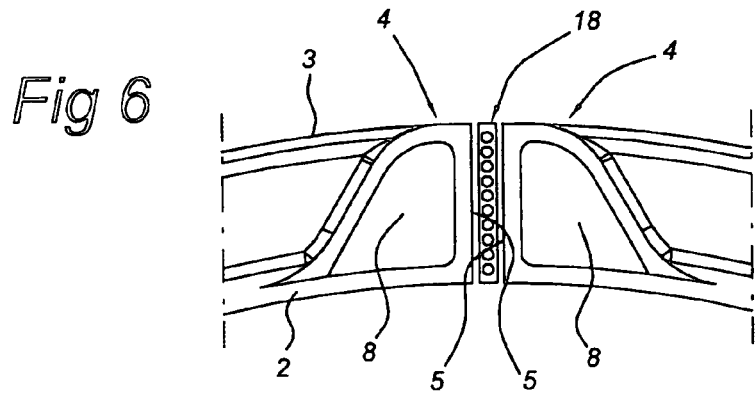

FIG. 6 for shows an enlarged view of the interconnection between two pipe segments by means of a welding strip.

Figure 7:
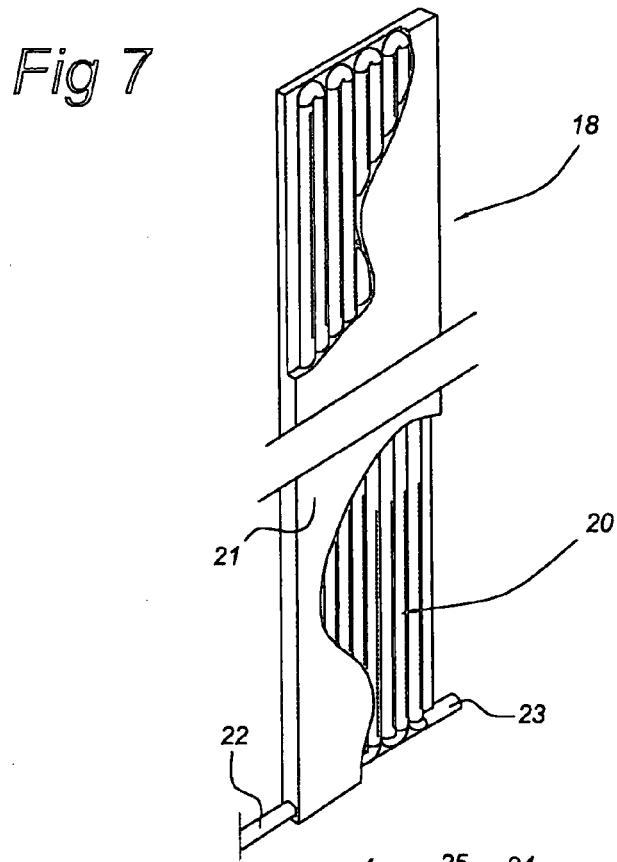

FIG. 7 shows a welding strip, to be used in the embodiment of FIG. 6.

Figure 8:
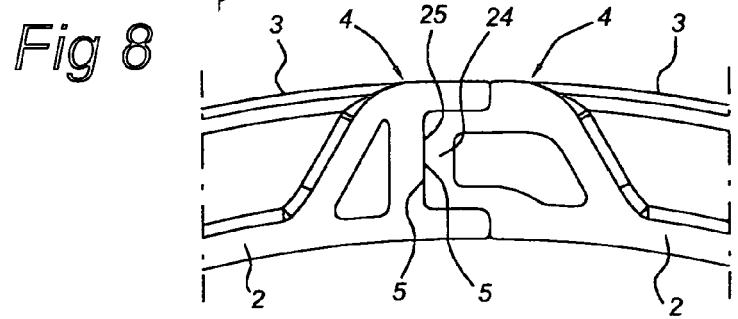

FIG. 8 shows an enlarged view of the interconnection between two pipe segments by means of interengaging corresponding shapes.

Figure 3:
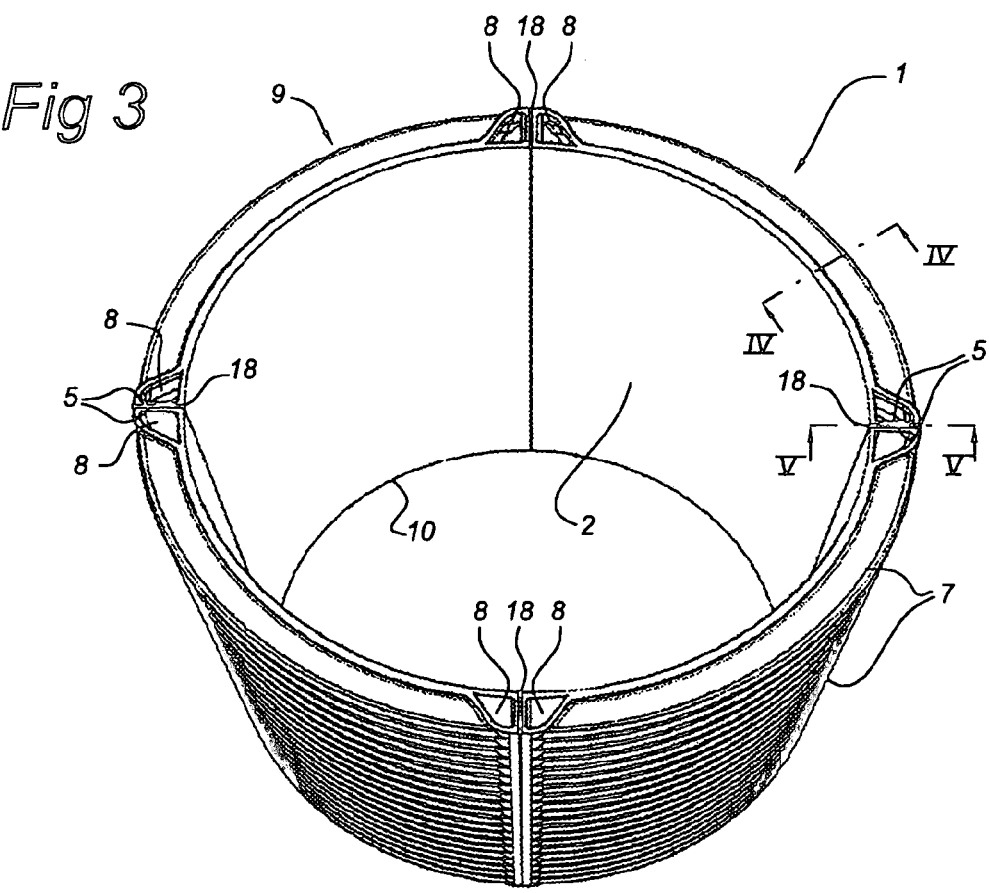
FIG. 3 shows a view in perspective of a pipe manufactured from the pipe segments in accordance with FIGS. 1 and 2.
Figure 9:
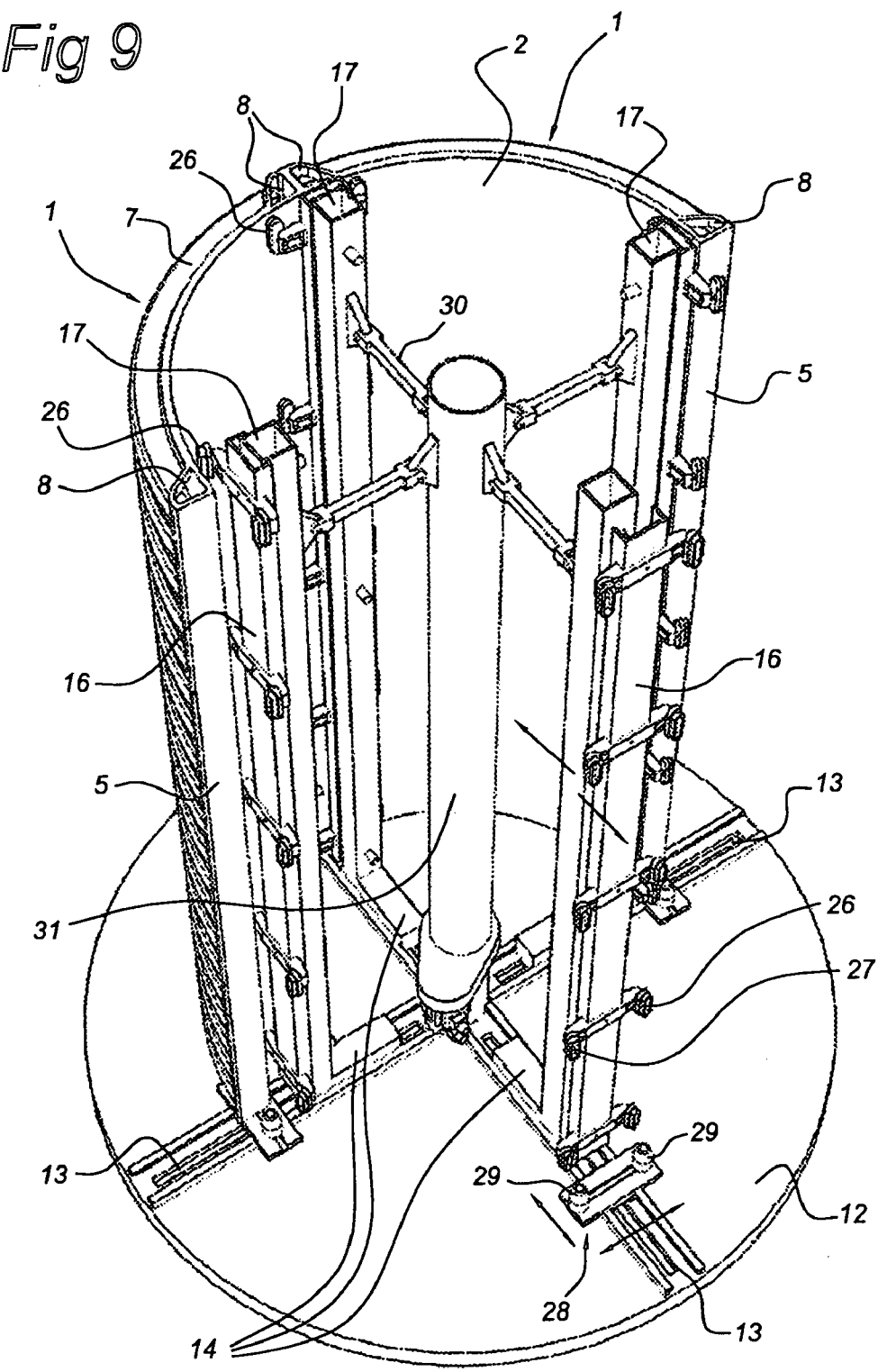

FIG. 9 shows an apparatus for use in the method of manufacturing the pipe according to FIG. 3, together with part of a pipe.

Figure 1:
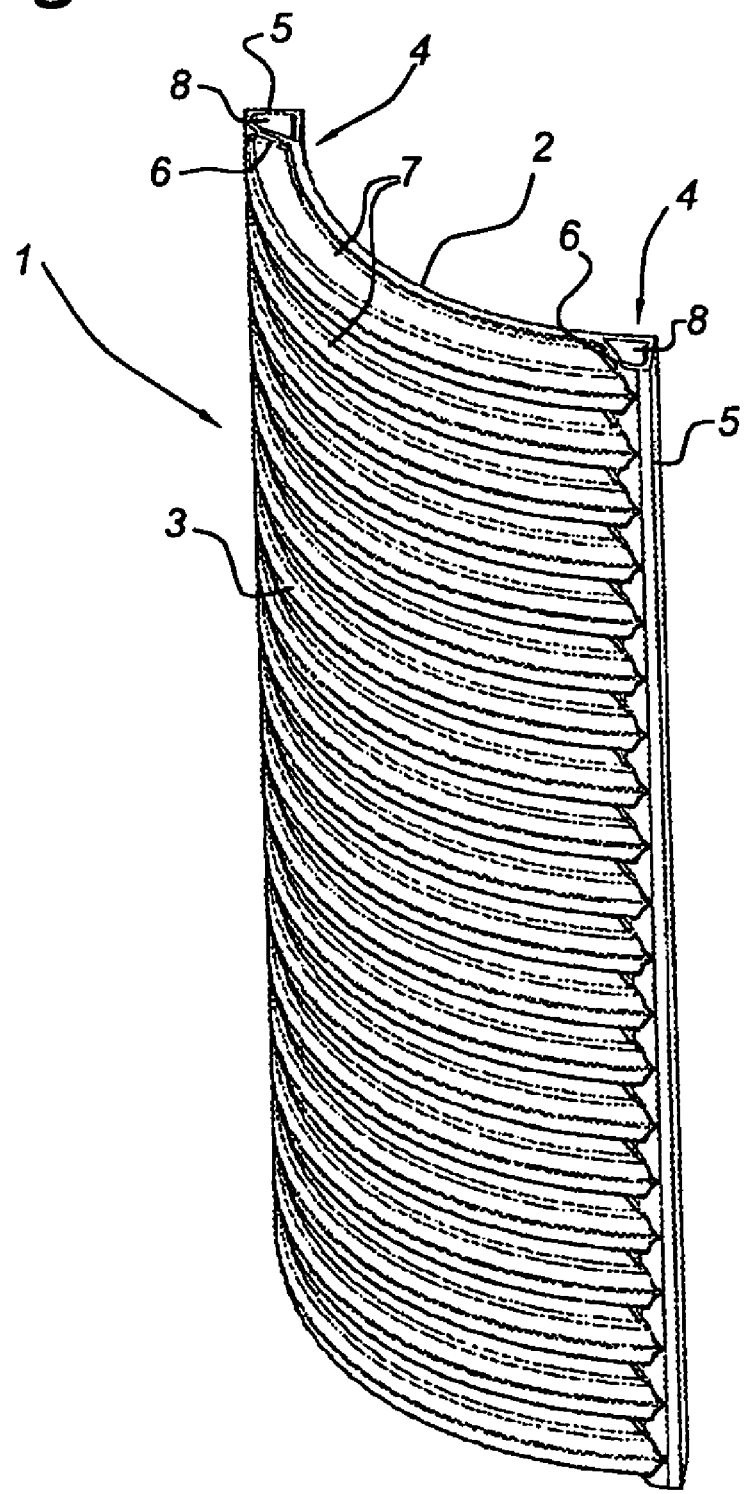
FIG. 1 shows a double walled corrugated pipe segement in perspective according to the invention.

The pipe segment 1 shown in FIG. 1 comprises a smooth inner wall segment 2 on the convexly curved outer surface of which a corrugated outer wall segment 3 has been connected, e.g. by welding. The process of obtaining such pipe segment 1 of a smooth wall segment 2 and a corrugated wall segment 3 is well known, and will not be described further. In the embodiment shown, the pipe segment 1 is curved according to a quarter of a circle; onto the longitudinal edges thereof the longitudinal profiles 4 are formed. Each longitudinal profile 4 comprises longitudinally extending strips of material having a plain outer surface 5.

Figure 2:
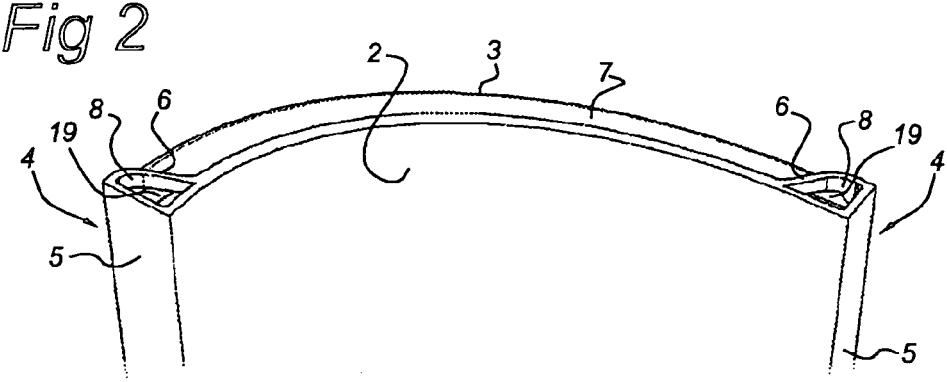
FIG. 2 shows a different view in perspective of the pipe segment according to FIG. 1.
Figure 4:
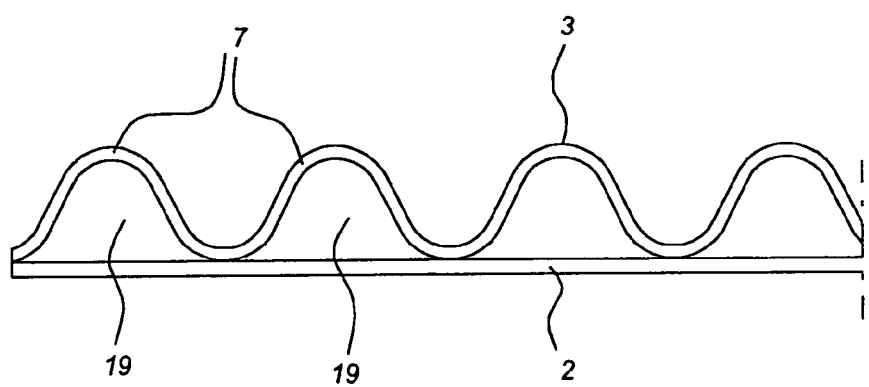
FIG. 4 shows the cross-section according to IV-IV of FIG. 3.
Figure 5:
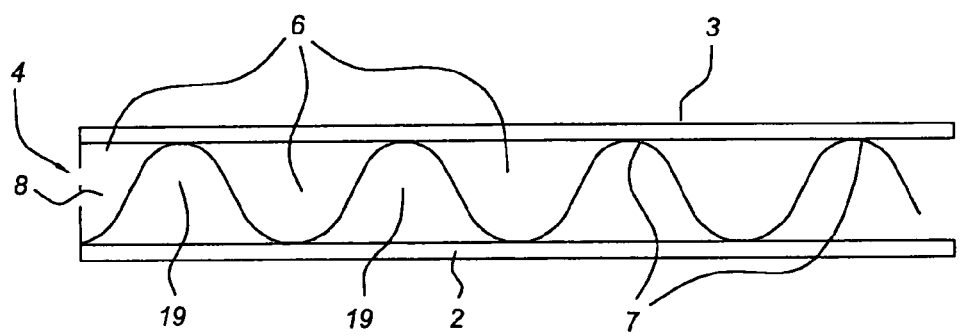
FIG. 5 shows to cross section according to V-V of FIG. 3.

At circumferentially opposite ends of the corrugated wall segments 3, slanting surfaces 6 are provided which are connected to a corresponding longitudinal profile 4 each. As a result, longitudinally extending channels 8 are formed, into which the circumferentially extending channels 19, each formed between a corrugation 7 of the outer wall segment 3 and the inner wall segments 2, emanate. Thus, a network of channels 8, 19 is formed which is accessible from the outside as is also shown in the FIGS. 4 and 5. This circumstance can be used for increasing the strength of the pipe segments further, for instance by filling this channel network 8, 19 with a solidifying substance, such as a concrete, a foam et cetera. The view in FIG. 2 shows these elements as well, as well as the hollow internal space 8.

As shown in FIG. 3, the plain surfaces 5 of each two adjoining longitudinal profiles 4 are connected to each other by welding through the welding strip 18, thus forming a complete corrugated pipe 9. This welding strip 18, which is shown in FIG. 7, is composed of plastic material matrix 21, as well as an electric resistance wire 20 embedded in said matrix material 21. By connecting the leads 22, 23 which emanate from the matrix material 21 to an electric source, the electric resistance wire 20 is heated for melting both the matrix material 21 as well as of the plastic material of the adjoining profiles 4. To that end, the welding strip 18 is interposed between the plain surfaces 5 of two neighbouring pipe segments 1, as shown in the enlarged view of FIG. 6.

As a result of the fact that the inner wall segments 2 provide a smooth inner wall 10, the pipe in question provides good flow characteristics for the fluids to be transported. Moreover, having regard to the double-walled character and the corrugated wall segments 3, the resistance against external pressures, such as earth pressures, of the pipe segment 1 in question are rather high.

The pipe segments 1 can also be connected to each other by mechanical means, an example of which is shown in FIG. 8. In this embodiment, the facing plain surfaces of the pipe segments 1 are provided with a ridge 24 on the one hand, and a groove 25 are the other hand. By pressing said ridge 24 into the groove 25, a firm connection between the pipe segments 1 can be obtained as well.

For reasons of production speed, the four welds which are applied to obtain the corrugated pipe section 9, are preferably carried out simultaneously. To that end, the apparatus according to FIG. 9 is used. Said apparatus comprises a base 12, provided with four rails 13. Slidably accommodated on the rails 13 are for shoes 14, onto which the supports 17 are erected, perpendicular with respect to the base 12. Each support 17 carries a fixture 16, provided with two series of suction cups 26, 27. Each pipe segment 1 is connected by suction to both series of suction cups 26, 27. The fixtures 16 are movable to and fro with respect to the corresponding support 17, as indicated by the arrows in FIG. 9.

Furthermore, pinches 28 are slidably accommodated on the rails 13. These pinches 28 each comprise a pair of studs 29, which studs 29 are movable towards and from each other. Each stud 29 can be accommodated in the lower part of the hollow space 8 of a pipe segment 1; by moving the studs and 29 towards each other, the plain surfaces of two adjoining pipe segments 1 are pressed onto each other. Said pressing onto each other of the plane surfaces 5 of the pipe segments 1 is furthermore promoted by making the fixtures are 16 move radially inwardly. Thereby, the pipe segments 1 are drawn closer towards each other, which results in the plain surfaces 5 being firmly pressed onto each other. This pressure is obtained over the full height of the plain surfaces 5, as a result of the fact that the pipe segments 1 are firmly connected to the fixtures 16 by means of the series of suction cups 26, 27.

As discussed before, the supports 17 are firmly supported on the base 12 at their lower ends. With the aim of further improving a firm support, the supports 17 at their upper ends are furthermore immobilized by means of the releasable struts 30, which provide a connection between said supports 17 and a central column 31 which is erected on the base 12 as well.

The invention claimed is:

1. A method for assembling a corrugated double-walled pipe section from pipe segments, comprising the steps of:
providing an inner wall segment which is curved in circumferential direction and straight in longitudinal direction, providing an outer wall segment which is curved in circumferential direction and corrugated in longitudinal direction, said outer wall segment defining circumferentially extending channels,
providing each circumferential end of the corrugated wall segment with a slanting surface,
connecting said inner wall segment to the concave side of said corrugated outer wall segment,
providing a longitudinal profile at the longitudinally extending edges of said wall segments so as to provide a pipe segment,
forming a longitudinally extending channel in each longitudinal profile,
connecting the adjoining longitudinal profiles of at least two of said pipe segments to each other, and
making the circumferentially extending channels emanate into the longitudinally extending channels.

2. The method according to claim 1, comprising the steps of:
providing longitudinal profiles each having an outer connecting surface,
making the outer surfaces of a pipe segment face away from said wall segments, and
welding or gluing the facing outer surfaces of two adjoining pipe segments to each other.

3. The method according to claim 2, comprising the step of:
welding or gluing the facing outer surfaces of two adjoining pipe segments under the influence of pressure.

4. The method according to claim 2, comprising the steps of:
providing a welding strip,
making the welding strip contact both outer surfaces of two adjoining pipe segments, and
welding the welding strip and the outer surfaces together by heating the welding strip.

5. The method according to claim 4, comprising the steps of:
providing a welding strip having an electrically heatable element, and
connecting the heatable element to an electric source and heating the welding strip by the heatable element.

6. The method according to claim 1, comprising the steps of:
providing the adjoining longitudinal profiles with corresponding shapes, and
connecting the adjoining longitudinal profiles of the pipe segments to each other by making said corresponding shapes engage each other.

7. The method according to claim 6, comprising the steps of:
providing one of said longitudinal profiles with a protruding ridge and the other of said longitudinal profiles with a correspondingly shaped groove, and
pressing the protruding ridge of one of said longitudinal profiles into the correspondingly shaped groove of the other longitudinal profile.

8. The method according to claim 1, for manufacturing an essentially circularly shaped pipe, comprising the step of:
providing pipe segments which are curved according to a part of a cylinder.

9. The method according to claim 2, for manufacturing an essentially circularly shaped pipe, comprising the steps of:
providing pipe segments which are curved according to a part of a cylinder, and orienting the outer surfaces of said longitudinal profiles according to radial planes.

10. The method according to claim 1, comprising the steps of:
providing a jig having a number of axially extending supports equal to the number of pairs of pipe segments to be connected to each other,
fitting each pipe segment between two neighboring supports,
making the supports move towards each other so as to exert pressure on the longitudinal profiles of each pair of adjoining longitudinal profiles in the direction towards each other, and
welding or gluing the adjoining the longitudinal profiles to each other while maintaining the pressure on the longitudinal profiles.

11. The method according to claim 10, comprising the step of:
simultaneously welding or gluing adjoining pairs of longitudinal profiles together.

* * * * *